Figure 1:
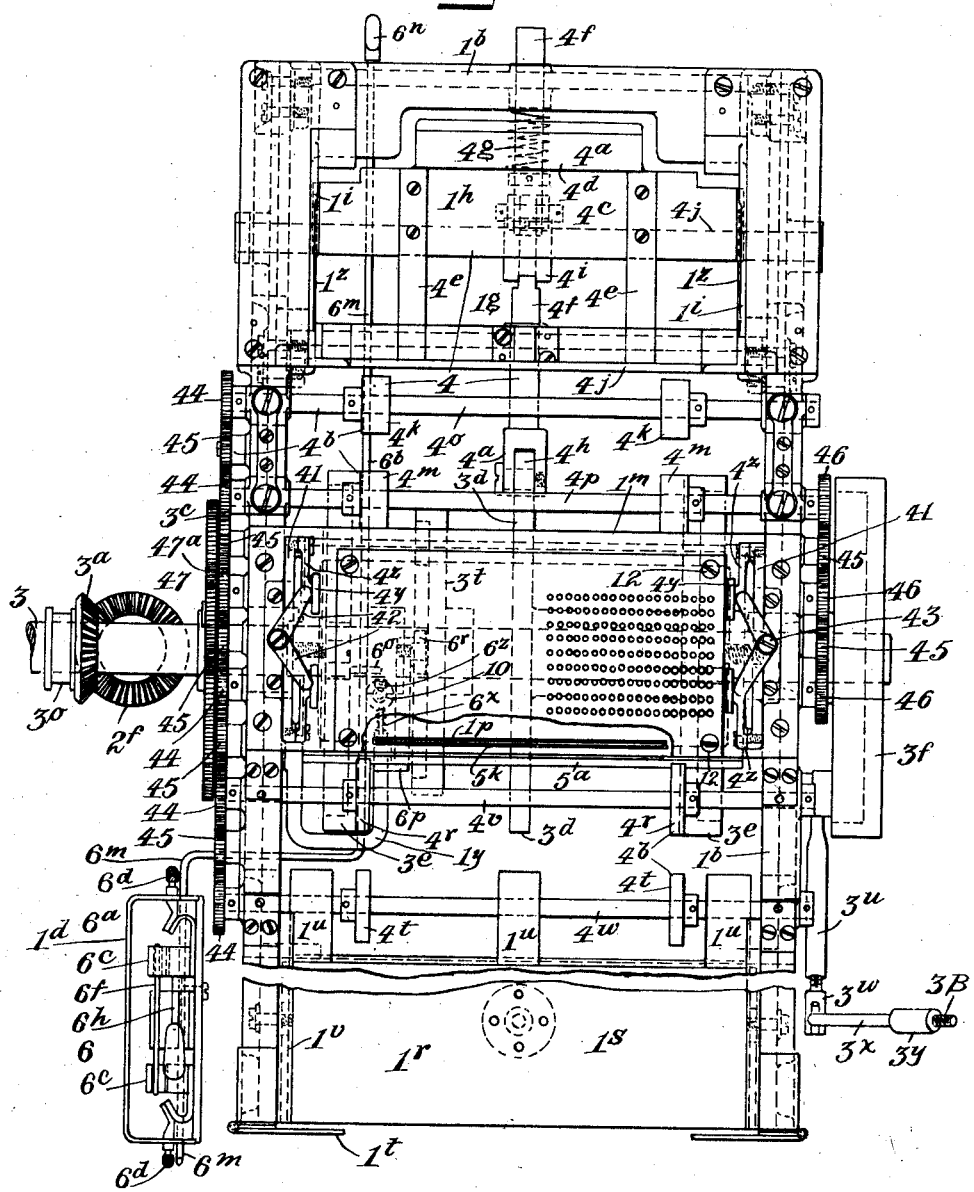

J. POWERS.
TABULATOR PRINTER FOR STATISTICAL PURPOSES.
APPLICATION FILED NOV. 22, 1913.

1,245,502.

Patented Nov. 6, 1917.
9 SHEETS—SHEET 1.

Witnesses:
A. B. Mattingly
Chas. E. Whiteman

Inventor:
James Powers,

By T. W. Richards, Attorney.

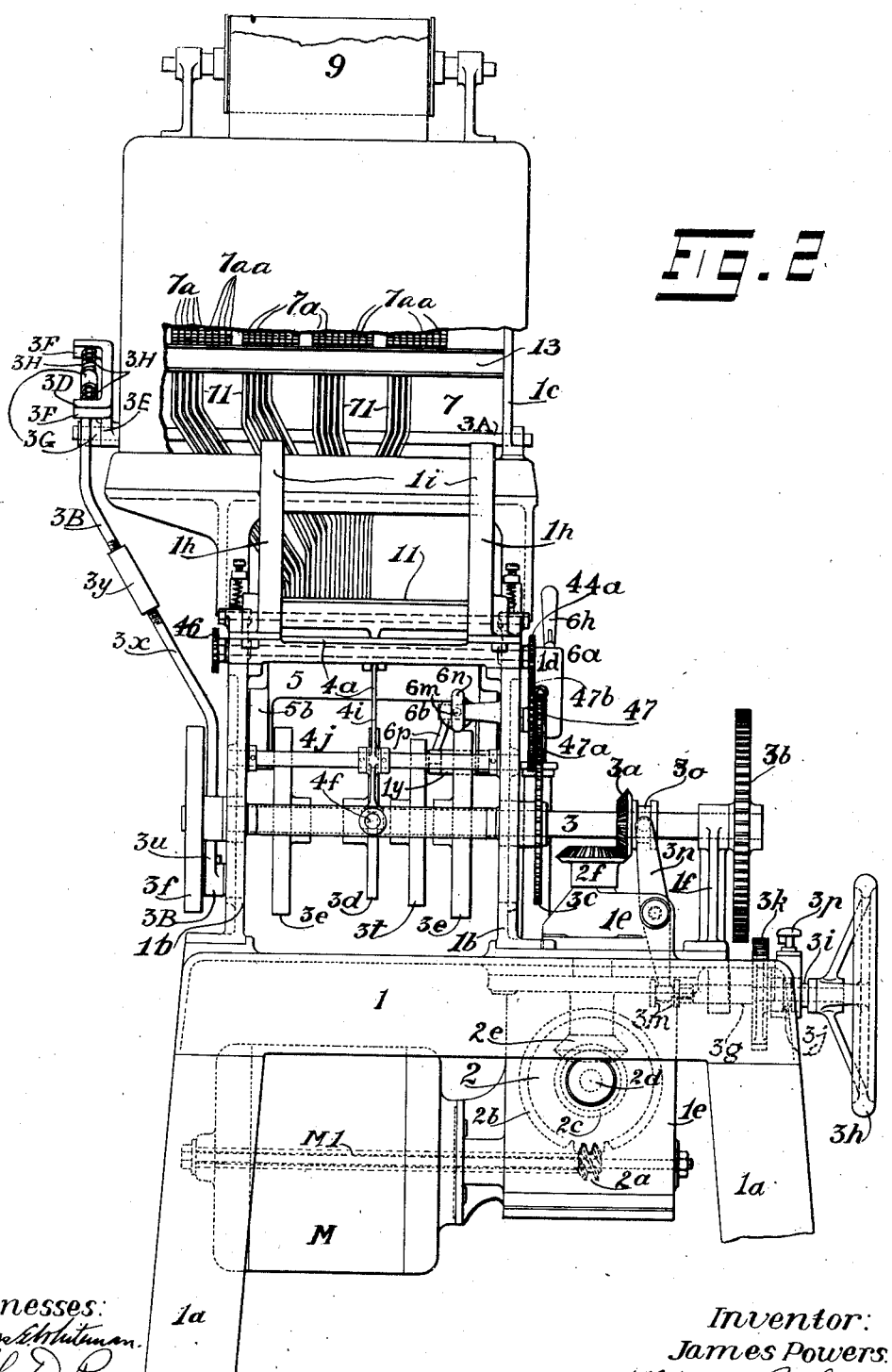

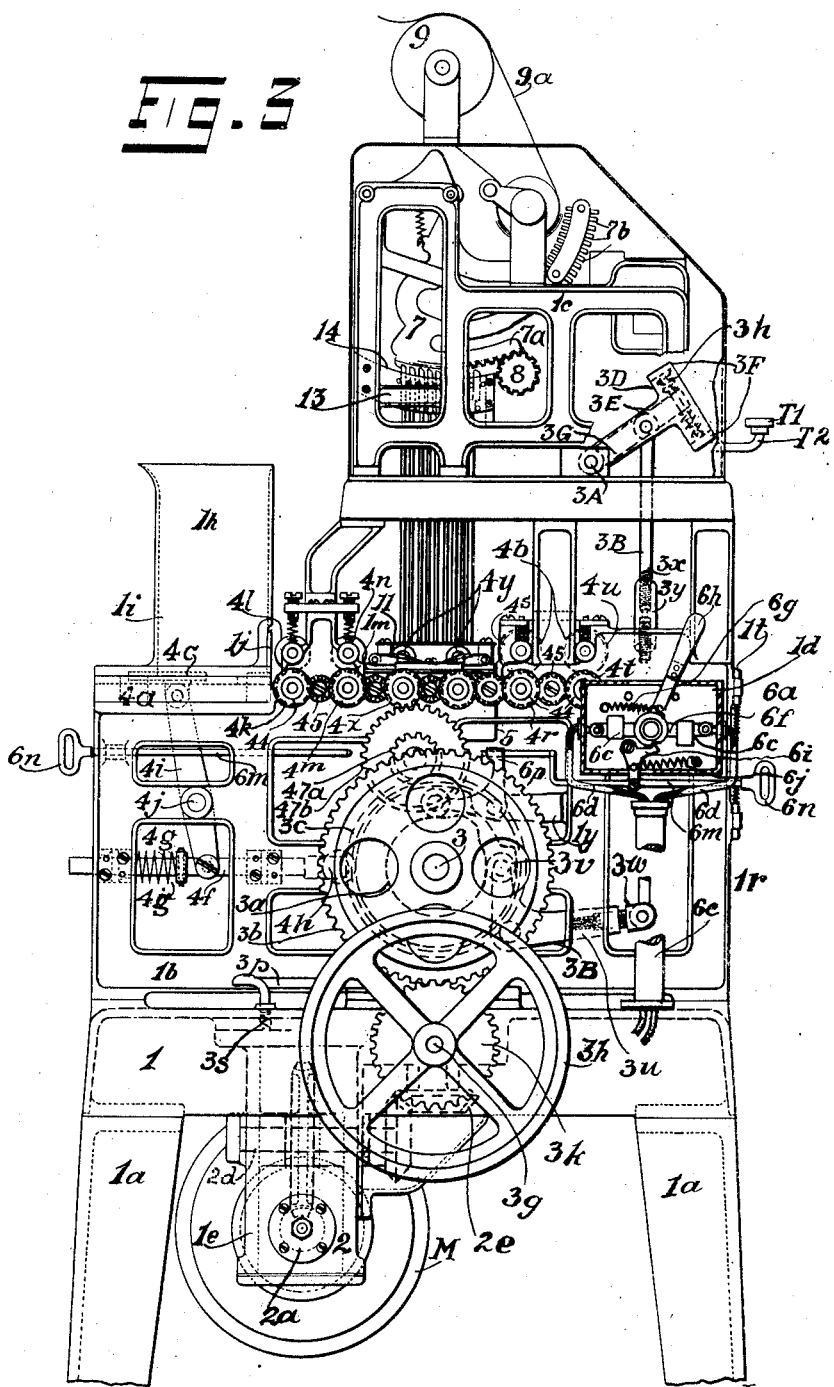

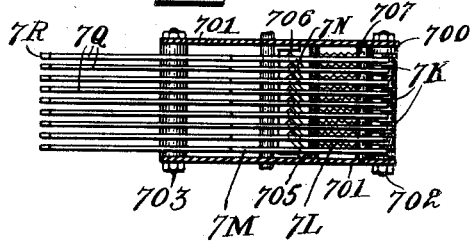
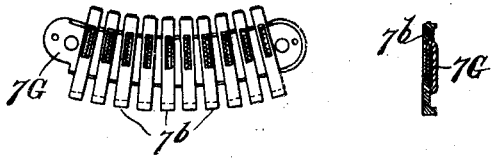
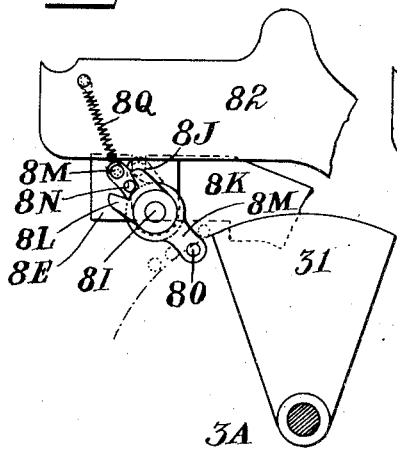
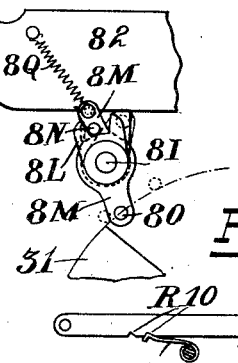
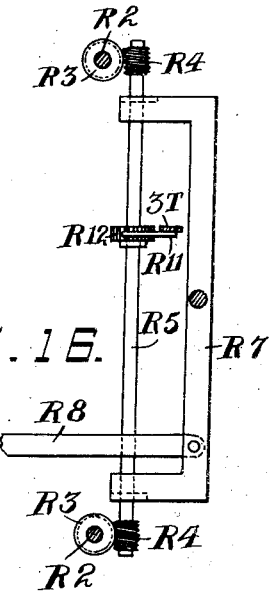

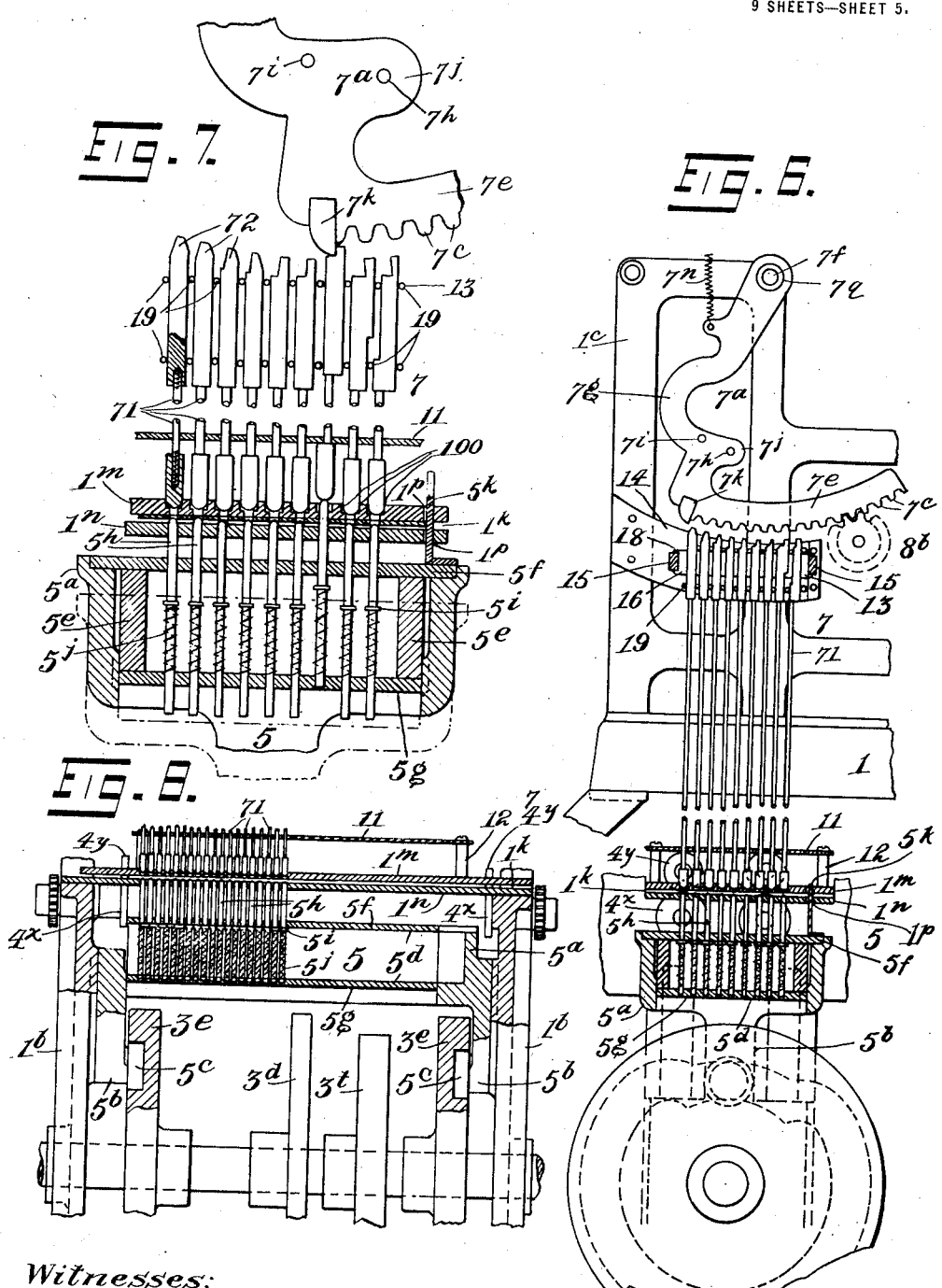

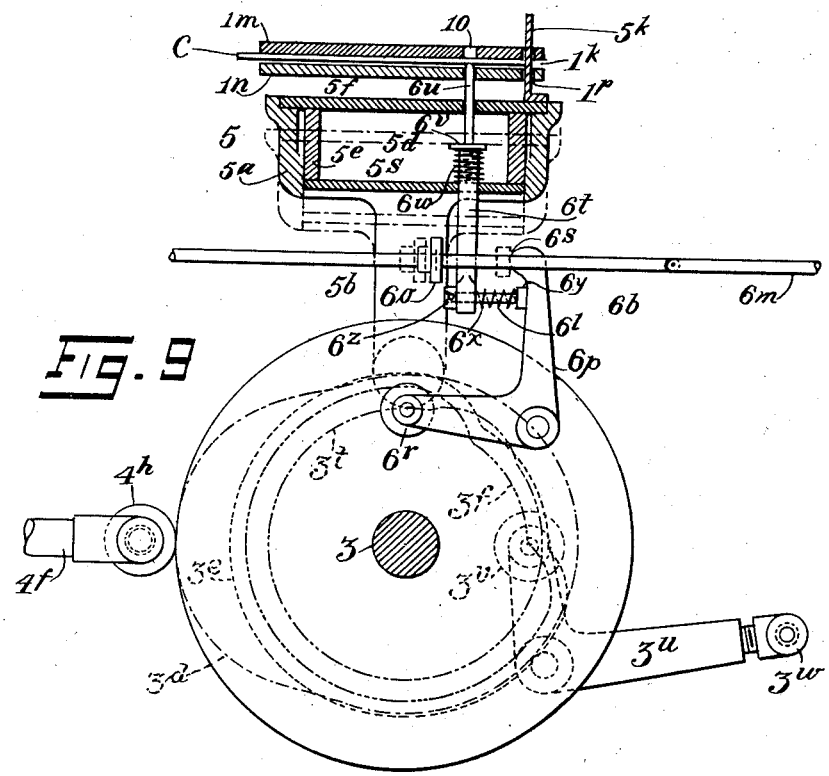

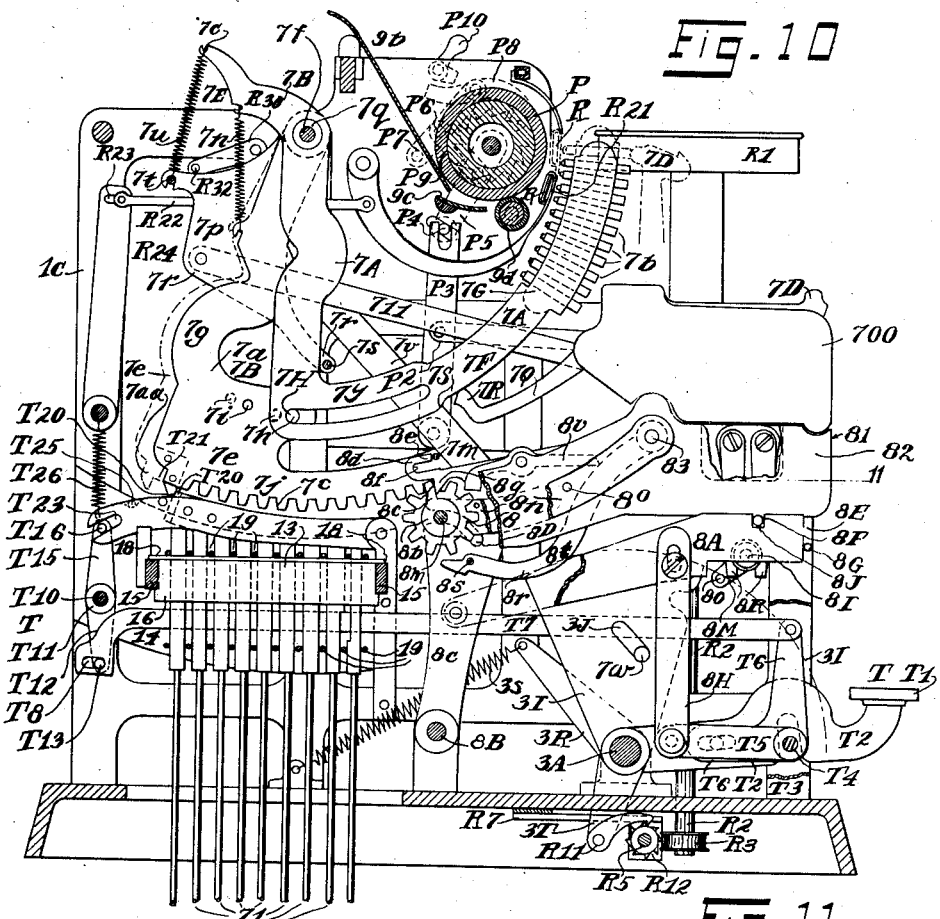
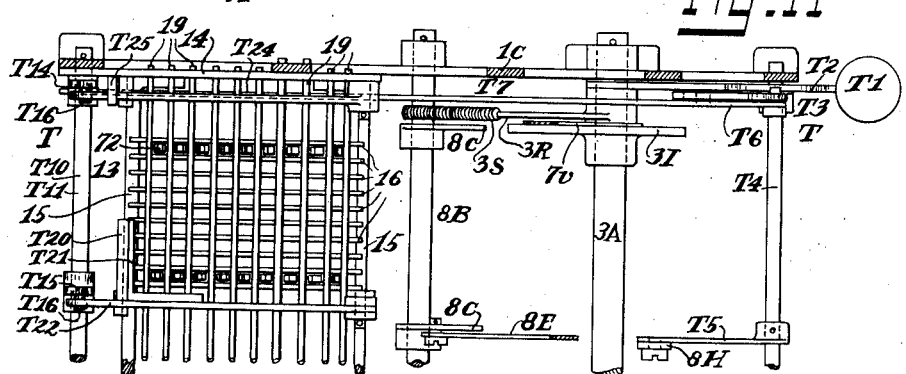

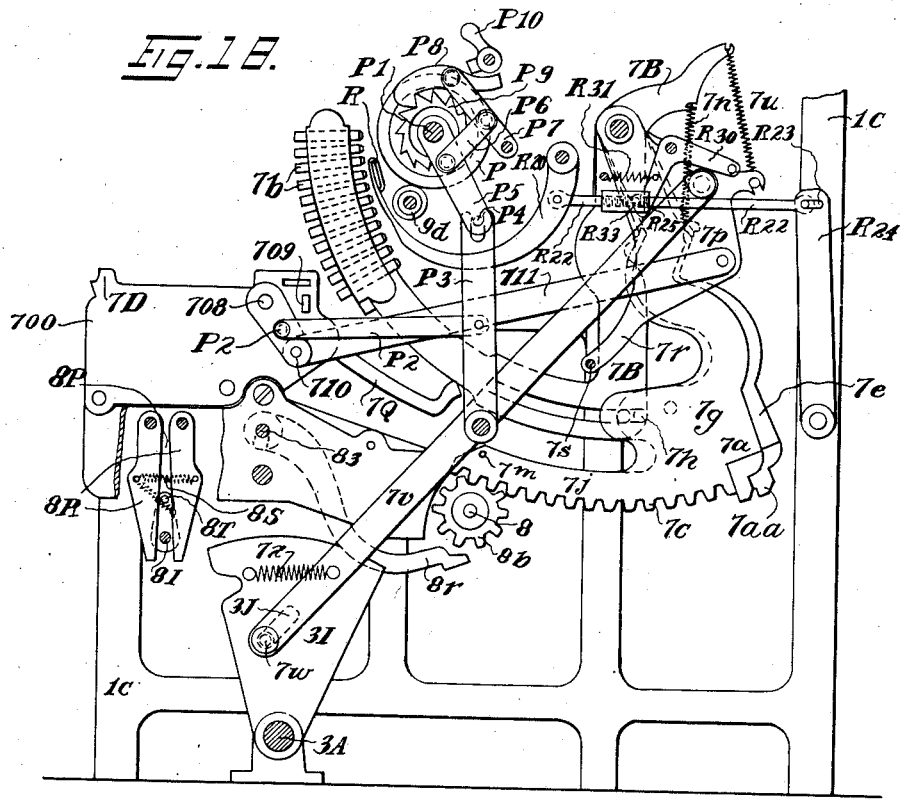

J. POWERS.
TABULATOR PRINTER FOR STATISTICAL PURPOSES.
APPLICATION FILED NOV. 22, 1913.

1,245,502.

Patented Nov. 6, 1917.
9 SHEETS—SHEET 9.

UNITED STATES PATENT OFFICE.

JAMES POWERS, OF NEW YORK, N. Y., ASSIGNOR TO POWERS ACCOUNTING MACHINE COMPANY, OF NEW YORK, N. Y., A CORPORATION OF DELAWARE.

TABULATOR-PRINTER FOR STATISTICAL PURPOSES.

1,245,502.  Specification of Letters Patent.  Patented Nov. 6, 1917.

Application filed November 22, 1913. Serial No. 802,363.

*To all whom it may concern:*

Be it known that I, JAMES POWERS, a citizen of the United States, residing in New York city, in the county of New York and State of New York, have invented certain new and useful Improvements in Tabulator-Printers for Statistical Purposes, of which the following is a specification.

The object of my invention is to provide a tabulating machine for printing and tabulating, upon a sheet or strip, of any desired plural number of various sorts of data; such selected topical data being recorded by suitably arranged perforations punched in a plurality or sequence of cards, which being fed one by one into such machine, produce the desired printed record, properly tabulated and totaled as to each topic.

To such ends, my invention comprises in substance, a supporting-frame, means or mechanism for causing actuating movement of the various working parts; a card-hopper for the reception of the perforated actuating cards; means for feeding the cards one by one from the hopper and passing them through the tabulating and printing actuating mechanism; printing mechanism for each datal topic to be recorded; tabulating selective mechanism controlled by the passage of the perforated cards, for causing actuation of the printing mechanism for recording the particular topical data indicated by each card; a separate adding and tabulating-adding mechanism for each datal topic indicated by the cards; and a stop mechanism whereby the machine will be automatically stopped; when a stop-body of suitable conformation, or a defective or improperly placed card is fed to the selective mechanism.

The analyzing and selecting mechanism, comprises in substance, a pair of plates supported by the main-frame, forming a card-support between which the perforated data-cards are fed one by one, both of such plates being provided with registering perforations, for each topical data to be recorded by the entire sequence of cards,—and adjacent to the card support are mounted a plurality of reciprocating-yielding pins, one for each topical perforation of the entire sequence of cards.

The printing and tabulating mechanism, which prints the record upon the strip, is so connected by intermediary mechanism with the various reciprocating pins, that when a card is positioned between the plates and the entire body of pins is forced against the cards, those pins that are stopped thereby will remain disconnected from the printing mechanism, while all those which pass through tabular perforations in such cases, will on the further movement of the machine cause actuation of the printing unitary type indicated by that particular perforation in the card through which such rod has passed.

The tabulating printing mechanism for each datal topic comprises a movable type-bar or sector carrying a suitable series or sequence of individually movable type, which type-bar is adapted to be brought into and out of operating connection with an adding mechanism; an individual hammer for printingly actuating each individual properly positioned type, one for each type-bar or sector; and mechanisms for reprinting the record tabulated and totalized.

Such mechanisms are combined in sets, each of which coacts with an individual group or series of control-pins to print the data relative to each individual data topic; and for each of these sets of mechanisms, there is provided an independent accumulative adder, operatively connected therewith; and to the machine may be added other supplemental, typing and accumulative adder printing mechanisms, for the purpose of recording large aggregations of topical data, in large numerical notation.

The paper supply and inking mechanisms herein shown, are each of well known types. A common retracting device times the operation of the type-carriers, stops those not printingly positioned, and retracts them all after printing, into the neutral position ready for repositioning.

A "totalizing-key," in operative connection with the adders and the supplemental carriers (if any) enables the operator to cause totals to be printed; and to clear the adders, and re-set them at zero, for a new card sequence.

The main shaft has a low-speed gear fixed to it, for hand-driving and a high-speed shift gear splined to it for power-driving; and also mounts members for driving the movable machine members. The motor is preferably electric and has the usual accessories. The transmission is mounted in a gear-case which mounts the motor and is bolted to the bed-plate, as a convenient assembling unit.

The transmission comprises a reducing gear train operably connected with the motor and terminating in a gear operably related to the shift gear on the main shaft. A hand wheel and a gear wheel adapted to mesh with the aforesaid low-speed gear, are fixed to a slide shaft hand-drive parallel with the main shaft and connected, by a shift-lever, with the shift gear thereon. Advancing the slide shaft disengages the shift and transmission gears and engages the slide-and-low-speed gears for hand-driving; and vice-versa.

The machine described and illustrated is for record cards having series of record points arranged in columns and rows, and in which one point in each column-series is perforated to record a fact. The feed comprises a card picker, reciprocated by a cam-and-lever connection with the main shaft, and gear-driven feed rolls. In practical use, a sequence of cards is placed in the hopper; the picker picks single cards, successively, from the bottom of the sequence and advances them to the rolls, which further advance them to contact with the register stop and operative position, and subsequently remove them; the pin box is advanced; such of its control pins as find no perforations in the card are thereby arrested and rendered non-functioning; but such as find perforations pass through them and the registering perforations in the card plates, advance their extension control-rods and transmit at their operative location, the card perforation record, whereby the so positioned control extension rod of each tabulating action positions its type carrier and thereby printingly positions its corresponding type, which is struck and printed by the hammer.

Just before their retraction, the adder for each set of carriers is advanced and its adding wheels severally meshed with the gear teeth of carriers; and the retraction of the carriers (by their retractors) causes the severally-connected adders to add, carry, and set totals for future printing at the same time the control pins, register stop and advanced control-extension rods are retiring; which permits the removal of the card; whereupon the machine is ready for another cycle. As successive cards of the sequence coact with the control-pins, the tabulating actions print the facts they record, and the adders add and carry totals, as is usual in such mechanisms. When the card sequence is analyzed and its selected records separately topically tabulated, the operator depresses the "total" key and causes the adders to properly set the carriers for, and the printing of, the totals.

In the accompanying drawings:—The feed-axis is assumed as the main, and that of the main shaft as the transverse axis of the machine.

Figure 17:
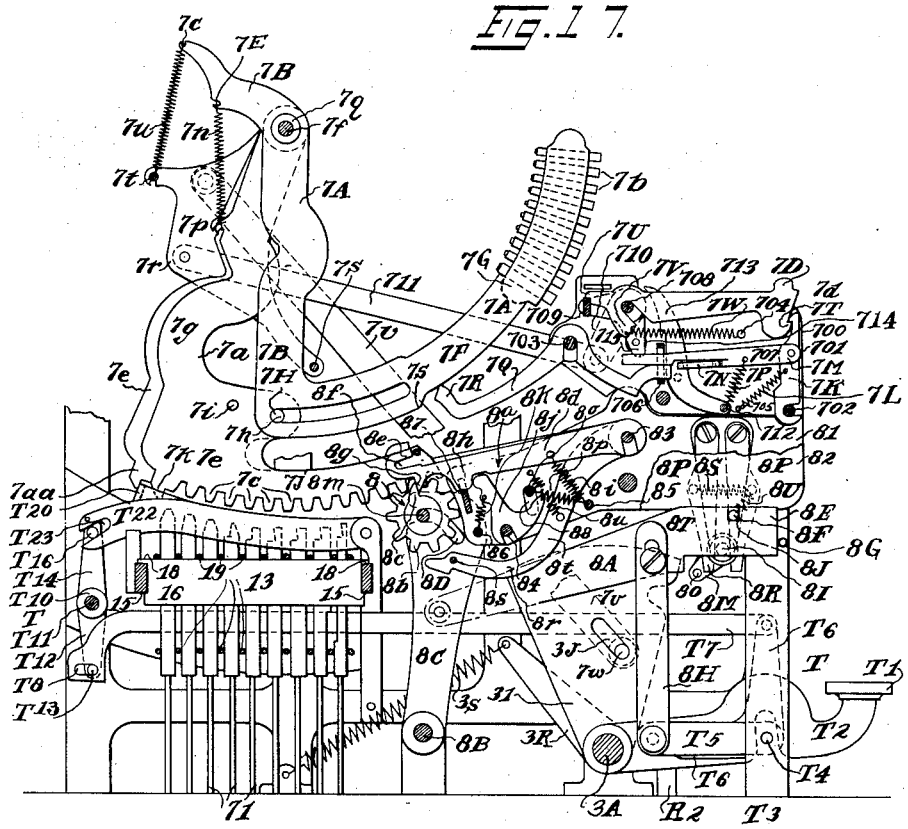
Figure 19:
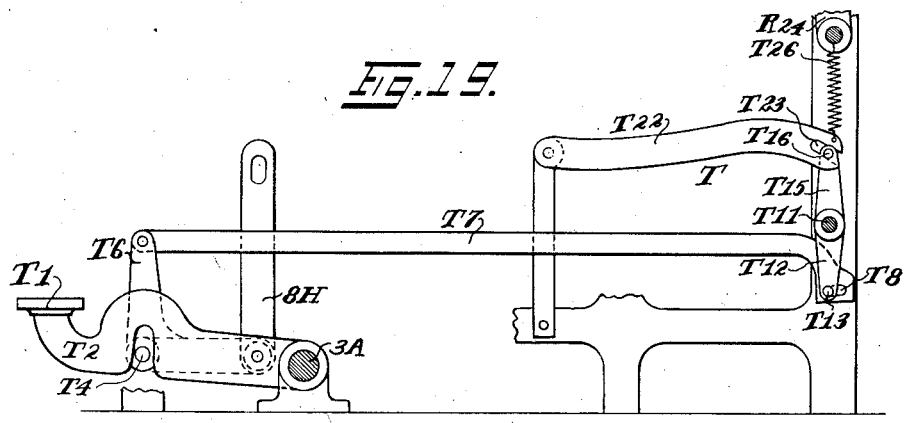

Figure 1 is a general plan, with the action frame and actions removed, Fig. 2 a side, and Fig. 3 a front elevation. Fig. 4 and Fig. 5 show characteristic cards. Fig. 6 is an enlarged partial axial section, Fig. 7 an enlargement thereof and Fig. 8 a transverse axial section corresponding thereto. Fig. 9 diagrammatically illustrates the cams. Fig. 10 is an axial section of the actions and Fig. 11 a corresponding partial plan on line 11—11 of Fig. 10. Figs. 12 and 12$^a$ illustrate the adder and actions and shafts. Fig. 13 is a sectional plan of the release of the hammer actions. Figs. 14 and 15 are an elevation and section of the type-sector cheek plate and type bars. Fig. 16 is a plan of the ribbon drive. Fig. 17 is an axial section similar to Fig. 10, but omitting the paper roll and ribbon mechanism, and on the other hand showing the details of the hammer actuating mechanism and the adder control mechanism. Fig. 18 is an axial section similar to Fig. 10, but looking at the same from the opposite direction to that of Fig. 10. Fig. 19 is an axial section looking in the same direction as Fig. 10 and merely showing the totalizing connection.

A bed plate 1 with legs 1$^a$ mounts a main frame 1$^b$ to which are fastened a card-hopper 1$^h$, an action frame 1$^c$, a switch frame 1$^d$, and a gear case 1$^e$ to which an electric motor, M, is bolted. The transmission 2 (Fig. 2) is mounted in gear case 1$^e$ and comprises a worm 2$^a$ on the motor shaft M$^1$, driving a worm wheel 2$^b$ and a bevel pinion 2$^c$, both on a shaft 2$^d$; and driven thereby a wheel pair comprising a bevel pinion 2$^e$, and final pinion 2$^f$, the latter operably related to a bevel shift-pinion 3$^a$ splined to the main shaft 3.

The main shaft 3 is mounted in bearings in the main frame 1$^b$ and has a bearing in a pillow-block 1$^f$ and a shift pinion 3$^a$ splined to it near the pillow-block, a low speed gear 3$^b$ (for hand-driving) on its near end, a feed-drive gear 3$^c$ adjacent to said frame, within it a central picker cam 3$^d$, a symmetrically-spaced pair of pin box cams 3$^e$, a switch cam 3$^t$; and an exterior action cam 3$^f$. A slide shaft 3$^g$ mounted in bearings in the bed plate, parallel with the main shaft 3, has fixed to it a hand-wheel $3^h$ whose hub contains annular grooves $3^i$ and $3^j$; a gear wheel $3^k$; and a socket $3^m$, which engages the head of a shift-lever $3^n$, pivoted on the gear case $1^e$ and terminating in a fork and pins which engage the shift pinion $3^a$ by means of an annular groove $3^o$ formed in its hub. A pivoted lock lever $3^p$ axially secures the slide-shaft by the engagement of its retractable tongue with one or other groove $3^i$ or $3^j$ of the hand wheel, and is so held by a spring, $3^s$, (Fig. 3) located in a socket in the bed plate and strained against the bent end of the lever, which is depressed to lift the tongue and free the slide shaft. Shifting the slide shaft disengages the shift—and final-transmission pinions $3^a$ and $2^f$, and engages the low-speed and hand-drive gears $3^b$ and $3^k$ to shift from power to hand-driving; or vice-versa.

The card hopper $1^h$ comprises a pair of end channel-guides $1^i$, (Figs. 1 and 2) fixed at the ends of opening $1^g$ in the main frame $1^b$, and connected by a gage blade $1^j$, whose lower edge gages the card path $1^k$ and limits the feed to one card at a time. Card plates, $1^m$, $1^n$, (Figs. 6 and 9) fixed to the main frame $1^b$, symmetrical relatively to its axes and to the card-path, have a plurality of series of registering holes corresponding with the record-point series (except the 9's) of record cards, and slots, $1^p$, for the register stop $5^k$.

The card feed, (Figs. 1 and 2) generally indexed 4, comprises the picker $4^a$ and roll organization $4^b$. The picker comprises a cam-and-lever drive and a plate $4^c$ with a rearward hardened picker blade $4^d$ raised a card-gage above its face, reciprocated beneath the hopper $1^h$ in the opening $1^g$ on flanges $1^z$. Slides $4^e$ in the plate $4^c$ guide it by engaging guide channels in said frame and support the cards. The drive comprises a slide-rod $4^f$ terminating in a forked head and cam roller $4^h$ held against the face cam $3^d$ by a spring $4^g$; (Figs. 1 and 2) and a lever $4^i$ medially pivoted on a pivot rod $4^j$ and slot-and-pin connected with the picker plate $4^c$ and slide rod $4^f$.

When the main shaft revolves, the cam $3^d$ (Figs. 1 and 2) reciprocates the slide rod $4^f$ and, by means of the lever $4^i$, the plate $4^c$; and the picker blade $4^d$ picks a card from the bottom of the hopper and advances it to the feed rolls $4^b$. The feed rolls are in symmetrically-spaced pairs at the sides of the card path. In describing each pair the first-used character denotes both lower pairs and the second the upper. They comprise supply primaries $4^k$ and $4^l$ and secondaries $4^m$ and $4^n$; delivery primaries $4^r$ and $4^s$ and secondaries $4^t$ and $4^u$; and intermediates $4^x$ and $4^y$. The lower supply primaries and secondaries $4^k$ and $4^m$ are respectively mounted on through shafts $4^o$ and $4^p$ (Fig. 1) and the delivery primaries and secondaries $4^r$ and $4^t$ likewise on shafts $4^v$ and $4^w$.

The lower roll axes are fixed; the upper primary and delivery bearings are spring-advanced in a known mode; but the upper intermediates $4^y$ are mounted and swiveled on arms $4^z$, pivoted on extensions 41 of the frame $1^b$ and advanced by plate springs 42, fixed to said frame in pairs and adjusted by screws 43. The lower supply, delivery, and near intermediate rolls are connected by a synchronizing gear train comprising gears 44 fixed to them and interposed idlers, 45; and the lower rear intermediates are synchronized and driven by a train comprising like gears 46 fixed to the supply-secondary shaft, $4^p$, and the intermediate spindles; and idlers 45. These trains are connected with the main shaft by a speed-multiplying train 47, comprising small and large integral gears respectively $47^a$ (Fig. 2) meshed with the gear $3^c$ on the main shaft and $47^b$ meshed with a synchronizing train gear $44^a$. This arrangement leaves between the intermediate rolls, a clear way for the reciprocating pin-box. The analyzed cards are delivered into a bin $1^r$, (Fig. 1) which is located by a spring-supported platen $1^s$ and which, during each cycle, lowers the card-gage, and in which bin the cards are retained by spring-closed leaves, $1^t$, and which are readily opened for the removal of the cards.

Fig. 4 ilustrates a stop-card Cs which, when fed into the machine, operates the switch and stops work. Such cards are added to the end of, or interpolated in, a sequence of record cards C (Fig. 5) for which the machine illustrated is especially designed, and which record railroad transportation data recorded by punching one record-point in each column, as shown by black circles. To the left are nine zones, perforated for topical sorting; appropriately headed, self-explanatory and not germane to this specification.

To the right (card C) are four zones respectively headed "Weight cwt.," containing four columns, one decimal, of ten record points; and "Freight charges," "Advances" and "Prepaid," each containing five like columns of dollars and cents. This machine will tabulate by topics, in print, and print sub and grand totals of facts recorded in the four right-hand zones; the analyzing and control pin-series and pins of its pin-box 5, and the tabulating actions 7 and their extension-rods 71 are respectively in consonance with the columns and record-points thereof (except the "9's") of said zones; as are also the sets of type carriers $7^a$ and the adders 8, respectively connected therewith.

The pin-box 5 (Figs. 6–9) is bisected by and reciprocated on the vertical axial planes of the machine, below the card plate $1^n$, has a quadrangular frame $5^a$, transverse axial guides $5^b$, which play in main-frame guides, and cam rollers $5^c$ which engage the slot cams $3^e$, by which it is reciprocated. A pin frame $5^d$ comprised of separators $5^e$ and, fastened thereto, a bottom pin-guide plate $5^g$ and an outstanding, pin-limit plate $5^f$ is positioned in the quadrangular frame $5^a$ by the fit of the margins of the limit plate $5^f$ with a finished recess thereon.

Said plates $5^g$ and $5^f$ are drilled with holes in a plurality of series like those of the card plates $1^m$, $1^n$, registering with the record points of cards C (except the "9's"). A like plurality of series of control-pins $5^h$ mounted in said holes, are normally extended, with their shoulders $5^i$ in contact with the limit plate, $5^f$, by springs $5^j$. A card register stop $5^k$, an angle plate fast to the posterior margin of the limit plate $5^f$, registers with slots $1^p$ in the card plates $1^m$ and $1^n$ and when the pin-box is raised blocks the card-path.

There are only nine pins $5^h$ and nine extension rods 71 in each series, corresponding with "0," "1," . . . "8," notwithstanding there are ten points, "0," "1" . . . "9," in each column of that portion of the record card with which this machine coacts. Pins $5^h$ and extension rods 71 for the "9's" are not necessary because when the carriers must print "9" they advance with their retractor to its limit, which printingly positions their "9" type.

When the pin box is retracted, all the pins $5^h$ are extended by their springs $5^j$, their tips slightly engage the series-holes, and the stop $5^k$ similarly engages the slot $1^p$ in the lower card plate $1^n$. The initial advance of the pin box 5 and that of its stop $5^k$ across the feed-plane is timed with the supply from the hopper of a card, which is arrested and operatively positioned by contact of its leading edge with said stop; and as the advance of the pin box continues, such pins $5^h$, as find no holes in the card are arrested and rendered non-functioning; but such as find holes extend above the upper card plate $1^m$, reproducing the record of the card, and causing the operation of the actions 7. The pin box is then retracted, the pins $5^h$ and stop $5^k$ clear the feed plane and the analyzed card feeds to the bin $1^r$.

The record-controlled, work-suspending mechanism 6 comprises a switch mechanism $6^a$, (Figs. 1 and 3) mounted in a frame $1^d$ and operably positioned by mounting it on the main frame $1^b$; and operating means $6^b$ (Fig. 9) mounted on the main frame and operably connecting the switch mechanism with the main shaft 3, and pin box 5 and adapted to coact with cards, to open the switch and cause work to be suspended. The mechanism $6^a$ comprises a pair of oppositely mounted poles, $6^c$, respectively connected with the motor M and with a power-supply by conduits $6^d$, which are led through a shield $6^e$; a knife, $6^f$ pivoted centrally between the poles, having a handle $6^h$ and normally latched closed, but when released thrown out of circuit by a spring $6^g$; and a latch $6^i$ engaged by a spring $6^j$ with the knife, adapted, when engaged, to hold the knife in circuit with the poles $6^c$, and operably connected with the operating means $6^b$.

Said operating means comprises (Figs. 2, 3 and 9) a switch-rod $6^m$ slidably mounted in the main frame $1^b$ and pin-connected with the latch $6^i$ and having handles $6^n$ and a drive-shoulder $6^o$ adjacent to the main shaft; a bell-crank $6^p$ pivoted on a curved bar $1^y$ attached to the main frame $1^b$, mounting at one end a roller $6^r$ in permanent engagement with the slot-cam $3^t$ and terminating at the other in a tappet $6^s$ rocked substantially parallel with the switch rod $6^m$, near its shoulder $6^o$; and a control-rod $6^t$ slidably mounted in the pin-box 5, parallel with and terminating (at the same plane as the pins $5^h$) in a pin $6^u$, in register with holes 10, in the card plates $1^n$, $1^m$; having a collar $6^v$ normally held in contact with the limit plate $5^f$ by a spring $6^w$ strained between it and the guide plate $5^g$; and slidably mounting, in a bore near its inward end and parallel with the switch rod $6^m$, a shift-bar $6^x$ with motive and active heads $6^y$ and $6^z$, and enveloped and extended by a spring $6^1$, strained between its motive head and the rod $6^t$.

When the pin box 5 is reciprocated and the control-rod $6^t$ is arrested by contact of its pin $6^u$ with an unperforated card, the control-rod locates the shift-bar $6^x$ out of line with the switch rod shoulder $6^o$ and lever tappet $6^s$, while the latter is idly rocked by the cam $3^t$. But if an imperfect record card be in the feed plane or one wrongly located, or a stop card, when the pin box 5 is extended the control rod pin $6^u$, finding no obstruction is held extended by its spring $6^w$, and passes through the holes 10; and the control rod $6^t$ locates the shift bar $6^x$ between the tappet $6^s$ and switch-rod shoulder $6^o$; the cam $3^t$ rocks the bell crank $6^p$, its tappet $6^s$ strikes the motive head $6^y$ of the shift-bar $6^x$, drives its active head $6^z$ against the shoulder $6^o$, shifts the switch-rod $6^m$, swings the latch $6^i$ and releases the knife $6^f$, whose spring $6^g$ swings it away from the poles $6^c$ and breaks the circuit.

The operator can suspend work by moving the switch rod $6^m$ and thereby lift the latch $6^i$ from the knife $6^f$, whose spring $6^g$ will instantly move it, break the circuit, and suspend work. When the switch rod is released the latch-spring $6^j$ returns said parts to operable position. To close the circuit and start work, the handle $6^h$ is operated to throw the knife $6^f$ into the slots of the poles $6^e$.

Each tabulating action 7, (Figs. 2, 6 and 7) comprises a series of (nine) direct-acting control-extension rods, 71 corresponding with "0" and the digits, except "9", supplement the length of the control-pins $5^h$ and extend them to operable locations; an oscillating type carrier $7^a$, (Figs. 10, 17 and 18) carrying a sequence of bars, $7^b$, each terminating in a type, and having gear teeth $7^c$ adapted to engage an adder action $8^a$; (Fig. 17) and a hammer action $7^d$. The action (except the rods 71) and the printing and adding mechanisms, are timed by the main shaft 3 and action cam $3^f$ (Figs. 2 and 3) through a rock shaft $3^A$, mounted transversely in the action frame $1^c$, and a link and lever connection $3^B$.

A cushioning arm $3^D$ on shaft $3^A$ comprises a swiveled arm $3^E$ with forks $3^F$, a fixed drive arm $3^G$ and springs $3^H$ interposed between its free end and the forks $3^F$. A bell crank $3^u$ pivoted on the main frame $1^b$ has on one arm a roller $3^v$ engaged with the slot cam $3^t$ (Figs. 1, 2, 3 and 9) and the other carrying an adjustable head, $3^w$, connected with the arm $3^G$ of the cushion arm $3^D$ by a link $3^x$, whose length is adjustable by a turn-buckle $3^y$.

On the action shaft $3^A$ is a retraction arm $3^R$, Fig. 10, between which and said frame a retraction spring $3^S$ is strained. The extension rods 71 have shanks having inward heads which play in the counterbored series holes 100 (Fig. 7) of the upper card plate $1^m$; outward heads; and thereon contact faces 72, substantially radial from the axis of oscillation; and they are mounted and guided in a perforated guide plate 11, fastened by studs 12 to the upper card plate $1^m$, and in a grille 13, Figs. 6, 7, 10 and 11, attached to the action frame and comprising support plates 14 fast to the action frame $1^c$; a pair of head plates, 15, uniting them; separator plates 16 parallel with the rod-series, fitting in and spaced by grooves in the head plates and located by ears 18, (Fig. 10) which rest on the upper faces thereof; and, transverse thereto, pairs of spacing rods 19 which extend between the support plates 14 and through the spacing plate.

The tabulating actions 7 are combined in four sets, Figs. 2 and 10, and enlarged by supplemental type carriers, $7^{aa}$, generally like those $7^a$, to make room for which (because pins $5^h$ are closely set) the upper ends of the actions being spread out and certain sets of extension rods, 71, Fig. 2, are offset.

During tabulation a "total" stop $T^{20}$ Figs. 10 and 11 limits the advance of said supplemental carriers so that they cannot print, but can carry units to their respective adder actions $8^a$.

The adding and printing action to be hereafter described in detail is like that shown in Hopkins, United States Patent No. 1039130, but for the purpose of more accurately describing the functions as they cooperate with my device, there is subtended hereto a specific description of the functions of the said adding and printing mechanisms in operative combination with my device.

Each type-carrier $7^a$ (Figs. 10, 17 and 18) comprises a movable gear segment $7^e$ and an adjacent type sector $7^A$, rocked in sets on their several retractor sleeves $7^q$, and a common pivot rod $7^f$, set transversely in the action frame $1^c$. Each segment $7^e$ has a sinuous stem $7^g$ and an arm $7^j$ with printing and limit stops $7^h$ and $7^i$ thereon, an analyzing finger $7^k$ with a contact face extending radially beyond the teeth $7^c$ to contact with extended extension rods 71 and printingly position type; and (except the initial segment) a carrying stop $7^m$.

The type sector $7^A$ comprises a lever stem $7^B$ which terminates beyond the pivot $7^f$ in spring-abutments $7^C$ and $7^E$, a concentric type arm $7^F$ against one face of which the radial type-bars $7^b$ are mounted by and in the slots of a plate $7^G$, and a positioning member $7^H$, normally held in contact with the printing stop $7^h$ of the segment $7^e$, the carrier being thus distended by a spring $7^n$ strained between the hook $7^E$ of the sector and the segment. Carriers to which units are carried remain thus distended and the initial segment always; but the others are closed one tooth-space and their limbs $7^H$ approach the limit stops $7^i$ at the cycle end.

Each action has an independent retractor $7^p$ which times the advance of the action carriers $7^a$ during tabulation, and of all carriers when printing large totals and positions those which print "9"; and retracts all of those advanced. It is a bell-crank and comprises a sleeve $7^q$ by which it is pivoted on the rod $7^f$, cheek plates $7^r$ united by said sleeve, a limit and retraction rod $7^s$ and has a spring-abutment rod $7^t$ between which, and the hook $7^C$ of each sector $7^A$, an independent spring $7^u$ is strained. Each retractor is driven and timed from the action shaft $3^A$ by a crank sector $3^I$ rocked therewith, containing a slot $3^J$; and a link $7^v$ pinned to a retractor cheek $7^r$ and armed with a pin $7^w$ which engages the sector slot $3^J$, therefore each sector $3^I$ can function with the other elements before it begins to move its retractor $7^p$. Keeper springs $7^x$ (Fig. 18) between each link $7^v$ and sector $3^I$ prevent rattling.

The hammer actions $7^d$ in each action-set constitute a carrying series mounted in an independent frame 700 and thereby operably related in the action frame $1^c$. The frame 700 comprises side plates 701 (Fig. 17) connected by two pivot rods 702 and 703, two spring abutment rods 704 and 705, a slotted guide plate 706, a latch-stop rod 707, and a shaft 708.

Each hammer action $7^d$ comprises a hammer $7^D$, a latch $7^K$, a release bar $7^M$, and a bent trip lever $7^Q$. The hammer is pivoted (in series) on the shaft 708, has a long arm with a terminal catch $7^T$ and hammer head, a retracting arm $7^U$ and a spring arm $7^V$ with a spring $7^W$ initially strained to the rod 704. The latch $7^K$ is pivoted (in series) on the rod 702 and is normally positioned against the latch-stop 707 by spring $7^L$ strained to the rod 705. The release bar $7^M$ is pivoted on the latch $7^K$, extends into a slot of the plate 706, rides the end of the trip lever $7^Q$ and (except the initial bar of the series) has a carrying finger $7^N$ bent under the adjacent release bar and a retracting spring $7^P$. The trip lever $7^Q$ is pivoted (in series) on the rod 703, one end extends into a slot of the plate 706 and carries the free end of the release arm $7^M$ and the other terminates adjacent to the type sector $7^A$ in a head $7^R$, adapted to be actuated by a cam $7^S$ thereon. When said sector $7^A$ is advanced, its cam $7^S$ contacts with and depresses the head $7^R$ of the trip lever $7^Q$ and causes its other end to raise and operably position the end of the release bar $7^M$, which rides it.

The retractor rocks the shaft 708 substantially through a quadrant by a link 711 connecting the retractor cheek $7^r$ with an arm 710 on the shaft, fixed to which is a common hammer-retracting and releasing crank bar 709 which, toward the end of its release stroke, contacts with such of the release arms $7^M$ as have been operatively positioned, extrudes them, swings their latches $7^K$ and releases the hammers $7^D$, whose springs $7^W$ cause them to strike corresponding type bars $7^b$ on such carriers as have set release bars, and thereby print. The crank 709 advances over and confines such release bars $7^M$ as have not been operably set. When the crank 709 moves oppositely it contacts with the retraction arms $7^U$ of such hammers as have struck, and returns them to engagement with their latches $7^K$, ready for another blow.

The carrying fingers $7^N$ of the release bars $7^M$ adapt the set of hammer actions to print numbers by causing operated release bars corresponding with units of a high order to set for release those of all the lower orders, so that their hammers may be struck and print naughts, even though the corresponding type carriers $7^a$, $7^{aa}$ have not advanced. For example, the last action in a series of nine, corresponds with units of hundred-millions. If a digit of this order be printed, it requires naughts or digits in all the other orders to make a number; which is true of all the actions except the initial, which corresponds with simple units.

Suppose the fourth action to printingly position "8" and the ninth action "4." The unoperated actions position naughts; do not advance; their hammer actions $7^d$ are not operated and if their hammers did not strike they would leave blanks in the record which would read 4 . . . 8 . . . ; but the operated release arms $7^M$ of high orders (by their fingers $7^N$) lift their predecessors in the series, cause their hammers to strike and the number to be properly printed,—thus, 400008000.

The spring $7^P$ of each release bar $7^M$ pulls down its free end and that of the trip lever $7^Q$, which it rides and holds the latter's head $7^R$ in contact with the face of the sector $7^A$ of the action; and in order that such contact should be positive, yet without undue friction, the other abutment of said springs $7^P$ is on the pin 712 of a forked rocker, pivoted on the frame plates 701 by its forks 713, which are held by the springs $7^P$ in contact with, and are rocked by crank wheels 714 mounted on arms 715, fixed on the shaft 708. This causes variable strains in the springs $7^P$.

When the retractor $7^p$ and type carriers $7^a$ advance and cams $7^S$ operate trip levers $7^Q$ and release-arms $7^M$, the retractor rocks crank bar 709 toward the free ends of said release arms. At such times maximum strain is desirable in the springs $7^P$ to make positive contact, and therefore the twin crank wheels 714 extrude the forks 713, rock the pin 712, cause maximum tension which holds the trip lever head $7^R$ firmly against the type sectors $7^A$. During retraction the above action is reversed.

Operably related to the (nine) carriers $7^a$, $7^{aa}$ of each set of tabulating actions is an adder 8, (Figs. 10 and 17) comprising a like number of adding-and-carrying actions $8^a$ each adapted, during carrier-retraction, to have its adding wheel $8^b$ engaged with the gears $7^c$ of a carrier $7^a$ or $7^{aa}$, to add and set up to "9" (for subsequent printing) totals of the units counted thereby; and whenever such addition attains or exceeds ten such units, to set the wheel for the proper character and carry a unit (by means of the adjacent carrier $7^a$ or $7^{aa}$, to the left, of the next higher numerical order) to the wheel $8^b$ coacting therewith; the adder 8 being further adapted to cause totals to be printed, during a forward stroke of the carriers, whenever the "total" key, $T^1$ is pressed; and to "clear" or return all its adding wheels to zero position.

Each adder 8 is a unit with an adder frame 8I mounting which in the action frame 1ᶜ properly relates the adding actions 8ᵃ to the tabulating actions 7 with which they coact. Said frame comprises plates 82 and two shouldered pivot bolts, 83 and 84; two riveted spring-abutment rods 85 and 86, a comb-plate 87 and a motive shaft 8ᴵ mounted in extensions of said plates.

Each adding and printing action 8ᵃ comprises one of said wheels 8ᵇ having, on the unit carrying side, a tooth 8ᶜ with a face toward the carrier and a radial stop face, meeting at the pitch circle and the far face of the "naught" tooth; a bell-crank 8ʲ; and a bar-stop 8ᵈ, except that the final action needs only a pawl co-acting with its wheel-spur 8ᶜ because no unit can be carried therefrom; and may have a bar-stop for purposes not germane to this machine. The wheels 8ᵇ revolve on the pivot rod 8ᵐ of a frame pivoted by its forks 8ⁿ on the ends of the frame bolt 83, said forks being united by riveted rod 8ᵒ, which plays in slots 88 in the frame plates 82, retracts active bell-cranks 8ʲ and is one abutment of adder-retracting springs 8ᵖ, strained between it and the frame rod 85.

The bar-stop 8ᵈ is pivoted (in series) on the frame bolt 83, normally non-carryingly positioned against the comb-plate 87 by a spring 8ˡ strained to the frame rod 85, guided in a slot of said comb-plate in line with and operable by the spur 8ᶜ of its wheel 8ᵇ, and plays between said wheel and the adjacent one of higher numerical order and between the segments 7ᵉ meshing with said wheels. It has a totalizing abutment spur 8ᵍ with abutment and tooth faces opposite to and respectively periodically co-active with the like faces of the wheel-spur 8ᶜ; inward therefrom a lug 8ʰ to whose perpendicular face the bell-crank 8ʲ is normally anterior to and beneath which it springs, to uphold the bar stop when carryingly positioned by the wheel-spur; and it terminates in a hook turned toward the carrier and having a nose-face 8ᵉ and, spaced therefrom one tooth-angle, a root-face 8ᶠ, both for periodically engaging the carrying stop 7ᵐ of the segment 7ᵉ of the adjacent, higher order action.

When the wheel and bar-stop spurs 8ᶜ and 8ᵍ have not coacted and said stop is spring-retracted, the normal, non-carrying, nose-face (8ᵉ) engagement occurs, stops and positively positions said higher-order segment and its adding wheel with the latter set at the number just added thereby and prevents the carrying of a unit thereto, from the wheel of the action under consideration; and sets the segment as for printing naughts. After said spurs 8ᶜ and 8ᵍ have coacted and carryingly positioned the bar stop 8ᵈ, the carrying, root-face (8ᶠ) engagement occurs, and said higher-order segment 7ᵉ, after having been retracted to alinement of its carrying pin 7ᵐ with the nose-stop 8ᵉ and having thereby turned its adding wheel to represent the number added by them, is further retracted through one tooth-angle, until its carrying stop 7ᵐ contacts with the root-face 8ᶠ, turns its adding wheel one tooth and carries a unit to it.

The bell crank 8ʲ is pivoted (in series) on the frame bolt 84 in line with the bar stops 8ᵈ, and a spring 8ᵏ, strained between it and the frame rod 86, holds it with one end against the fork rod 8ᵒ and the other adjacent to the bar stop lug 8ʰ, when the adder is retracted; but the rod 8ᵒ when advanced, moves away from such bell-cranks 8ʲ as contact with lugs 8ʰ and permits others to advance beneath such lugs and temporarily fix the position of carryingly-positioned bar-stops 8ᵈ.

The positions of the gears 8ᵇ are controlled during adding, by meshing segment teeth 7ᶜ of tabulating actions 7; during the printing of totals they are positioned by the contact of their spurs 8ᶜ with bar-stop spurs 8ᵍ; and when the adders are retracted, accidental displacement of said wheels is prevented by locking them with an automatic, forked stop 8ʳ, comprising a stop rod 8ˢ fixed to forks 8ᵗ swiveled on the frame bolt 83, advanced to engagement by springs 8ᵘ and retracted by the advance of the gears 8ᵇ toward the carrier teeth 7ᶜ, by means of twin levers 8ᵛ, pivoted on the frame plates 82, and abutting at their opposite ends, on the wheel-carrying forks 8ⁿ and the stop forks 8ᵗ.

The mechanism 8ᴬ (Figs. 10 and 11) comprises a rocking cam, pivoted, beneath the adder pivot 8ᵐ, to the action frame 1ᶜ, by its rock shaft 8ᴮ, and having fixed thereto forks 8ᶜ containing cam slots 8ᴰ which engage the ends of the wheel pivot 8ᵐ and position it and the adding wheels 8ᵇ; a link 8ᴱ which is pivoted at one end to one cam fork 8ᶜ medially supported and slot-and-pin connected with the total key bar T² by a swiveled post 8ᴴ; has an upper marginal drive slot 8ᶠ for operable engagement with the shaft 8ᴵ, and has its wheel-engaging position fixed by a stop 8ᴳ; and the shaft 8ᴵ, fixed to which are, at one end, a drive crank pin 8ᴶ adapted to engage the notch 8ᶠ of the link 8ᴱ, and at the other end a compound, limit-motion crank 8ᴵ (Figs. 12 and 12ᵃ) consisting of a slot crank 8ᴸ fixed to said shaft, and a cross crank 8ᴹ pivoted thereon and having opposite drive and initial crank pins 8ᴺ and 8ᴼ, the former engaging the cheeks of the slot crank and the latter periodically engaged by the sector 3ᴵ of the action shaft 3ᴬ.

The sector 3ᴵ rocks to either side of the normal position of the initial crank pin $8^o$, which, when not riding the sector, is located across its plane, for motion in one or other direction, by a spring $8^Q$ strained between the cross crank $8^M$ and the adjacent frame plate 82; and by an interior positioning mechanism $8^P$ (Fig. 18) comprising a pair of arms $8^R$ pivoted to either side of the vertical axial plane of the shaft $8^I$ and a spring $8^S$ in initial strain between the crank arm of said pin $8^T$ and the outer positioning arm $8^R$.

Fig. 10 shows the action sets with their members and complemental mechanisms related as follows:

The retractors $7^p$ are fully retracted and their limit rods $7^s$ aline all the type sectors $7^A$ with their "naught" type bars $7^b$ one tooth-angle anterior to printing position. Those carriers $7^a$ (except the initial one) whose segments $7^e$ did not "carry" during the cycle just completed, are closed one tooth angle, their type sectors $7^A$ being positioned by a limit rod $7^s$ and their segments $7^e$ by contact of their carrying stops $7^m$ with the nose-faces $8^e$ of non-carrying bar stops $8^d$, and with their analyzing fingers $7^k$ in or very slightly retracted from the printing position naught; but the initial carrier and those which have just carried a unit are substantially fully distended, because, while their sectors $7^A$ are positioned by limit rods $7^s$, their segments are positioned by contact of their respective carrying stops $7^m$ with the root-faces $8^f$ of carryingly-positioned bar-stops $8^d$.

The hammer shafts 708 and their crank bars 709 are shown in Fig. 17 as having retracted the hammers $7^D$ and engaged them with the latches $7^K$; the trip levers $7^Q$ inactive, with their heads $7^R$ one tooth-angle from the sector cams $7^S$; the adder shafts $8^I$ with their initial crank pin $8^o$ in the paths of the crank-sectors $3^I$ (when the sectors are at normal rest) and with their drive cranks $8^J$ engaged with the notches $8^F$ in the links $8^E$; and the cam supports $8^C$ radial from the adding wheel pivots $8^m$, whose ends are in the advanced portion of the cam slots $8^D$, which have thus advanced the adder 8; the adding wheels $8^b$ cleared from the stop-rod $8^s$ and meshed with the carrier teeth $7^c$; and carrying levers $8^d$ positioning segments by coaction with their carrying stops $7^m$.

The motion cycle is as follows:

The pin box and card advance toward their functioning while the tabulating actions 7 rest, and such control pins $5^h$ as find record perforations in the card pass through them; extrude extension rods 71, raise their contact faces 72 into the paths of fingers $7^k$ of type carriers $7^a$ and there reproduce, by the position of said faces 72, the card record.

During this stage, the cam $3^f$ operates the action shaft $3^A$ and sectors $3^I$, which idly swing the links $7^v$ and let the retractors and carriers rest until the link pins $7^w$ contact with the upper ends of the crank-sector slots $3^J$. This limit of the sectors' arc of motion suffices for the adder-disengaging motion of the adder shafts $8^I$, to effect which the anterior edges of the crank sectors $3^I$ extrude, and the sectors slide under the initial crank pins $8^o$ of, and thereby rock said shafts and their drive-crank pins $8^J$ which, being engaged with the notches $8^F$ of the links $8^E$, advance them, rock the cam forks $8^C$, advance their cam slots $8^D$ over the adder pivots $8^m$ and retract the adding wheels $8^b$ from the carrier teeth $7^c$ and bar-stop spurs $8^g$; which motion operates the stops $8^r$ and causes their stop rods $8^s$ to engage said wheels. These relations of the adders 8 obtain during the remainder of the anterior motion of the crank sectors $3^I$ save that the crank sector faces pass beyond the initial crank pins $8^o$ and permit them to be rocked on the adder shafts $8^I$ and returned by the positioning mechanism $8^P$, across the paths of the sectors $3^I$, ready to be operated by the posterior motion thereof and caused to reverse the position of the adders 8. The play of the pins $8^N$ between the cheeks of the slot cranks $8^L$ permits such motion of the initial crank pins $8^o$ relatively to the adder shafts $8^I$ and their fixed crank members.

The retraction of the swiveled adder forks and their rods $8^o$ retracts all active bell cranks $8^j$ from under lugs $8^h$ of carryingly set bar stops $8^d$, to permit their retraction. After the adder wheels have been retracted, the far ends of the sector slots $3^J$ contact with the link pins $7^w$ and the links $7^v$ advance the retractors. The springs $7^u$ and $7^n$ respectively draw the sectors $7^A$ against the limit rod $7^s$, and tend to distend the carriers. During initial advance all the sectors $7^A$ advance with the retractor; as do the segments $7^e$ of the fully distended carriers $7^a$ or $7^{aa}$ which carried units to wheels; but the segments $7^e$ of those which did not carry, rest until one tooth-angle of motion is completed, all the carriers are fully distended, the sector cams $7^S$ are adjacent to the trip-lever heads $7^R$, the analyzing fingers $7^k$ at their naught-printing location and those of the supplemental carriers $7^{aa}$ are adjacent to "total" stops $T^{20}$ which prevent their further advance. During the remainder of the advance the analyzing fingers $7^k$ of the tabulating actions contact with control-extension rods in their paths (except that those which print "9" are so positioned by the retractor), thereby analyze the card record so reproduced and translate it into common terms by printingly positioning proper type and causing them to be struck by their hammers $7^D$, which are released by the sector cams $7^S$ while advancing from the "0" to the "1" printing-position.

The pin box 5 descends; the card just analyzed is removed; the cam $3^f$ reverses the crank-sectors $3^I$, during whose initial motion the link pins $7^W$ play idly in the sector slots $3^J$ and the tabulating actions rest; but the posterior radial edges of the sectors $3^I$ extrude and said sectors slide under the initial crank pins $8^O$ of the adders, rock their shafts $8^I$ and driving crank pins $8^J$, retract the links $8^E$ to contact with their stop $8^G$, retract the cam forks $8^C$, and cause their cam slots $8^D$ to advance the adding wheels $8^b$, release them from the stop rods $8^s$ and mesh them with the carrier teeth $7^c$ and locate their spurs $8^e$ for coaction with the bar-stop spurs $8^g$.

The crank-sectors $3^I$ complete their cycle, pass and release the initiating crank pins $8^O$, which the positioning mechanisms $8^P$ return to their normal position; the far ends of the slots $3^J$ contact with the link pins $7^w$ and begin to retract the retractors $7^p$ and action carriers $7^a$, whose sectors $7^A$ and segments $7^e$ move together, and the teeth $7^c$ on the latter rotate adding wheels $8^b$ severally in mesh with them and cause the series of wheels to add and "carry". Each wheel $8^b$ has ten teeth corresponding with a decimal series of the order of units in which its type carrier prints, and said teeth correspond respectively, with "0" and the digits; and its spur $8^e$, extends substantially to the pitch circle at its intersection with the posterior face of the "naught" tooth.

Whenever the sum added attains to or exceeds the full series of the order corresponding with a wheel, and it must set "0" or a digit and carry "1", its spur $8^e$ contacts with that, $8^g$, of the bar stop $8^d$ and lifts it, so that its root-face, $8^f$, lies athwart the path of the carrying pin $7^m$ of the adjacent segment $7^e$ (to the left as a number is read) of numerically higher orders; and it is there retained until the completion of the cycle by the bell crank $8^J$, whose nose is advanced under the lug $8^h$ of, and supports said bar-stop.

One tooth-angle prior to the full retraction of the retractors $7^P$ the segments $7^e$ of action carriers $7^a$ to which units are not to be carried, are stopped and positioned, with their fingers $7^k$ anterior to and the naughts on the printing location, by contact of their carrying stops $7^m$ with the nose-faces $8^e$ of non-carrying bar stops $8^d$. These carryingly-positioned bar-stops have their root-faces $8^f$ across the paths of the carrying stops $7^m$ of adjacent segments $7^e$, to whose related mechanism units are to be carried; and the limit rods $7^s$ of the retractors contact with the sectors $7^A$ of the supplemental carriers $7^{aa}$. While the retractors are being retracted through the last tooth-angle, their limit-rods $7^s$ retract all the type sectors $7^A$, but the segments $7^e$ of non-carrying carriers $7^a$, $7^{aa}$, are held stationary by contact of their carrying stops $7^m$ with nose-faces $8^e$ of non-carrying bar-stops, and said carriers are contracted one tooth-angle; while all carriers to whose wheels units are to be carried remain fully distended, their segments $7^e$ (Fig. 10) move through the final tooth-angle, severally rotate their adding wheels $8^b$ one more tooth, and thereby carry units to and properly set them to represent totals, for subsequent printing.

It will be seen that, in tabulating, the action carriers $7^a$ move with the retractors except when positioned by control-extension rods or during its final retraction angle when not carrying units; but among the supplemental carriers $7^{aa}$ the non-carrying ones merely contract and distend one tooth-angle, their sectors $7^A$ moving and their segments $7^e$ resting; while carrying ones remain distended, rock through the final tooth-angle and thereby add and carry, make their adding wheels operative parts of the machine and greatly increase its capacity without correspondingly increasing the number of control pins $5^h$ and extension rods 71.

To cause the machine to print totals, it is necessary to reverse the tabulation relations of the carrier gears $7^c$ with the adders 8, and during the advance of the carriers, mesh the adding wheels $8^b$ with the carrier teeth $7^c$ and bar stop spurs $8^e$, so that said spurs will severally be the abutments for, and, by contact with the wheel-spurs $8^c$, fix the wheels, to position the type-sectors $7^A$ and proper type bars $7^b$ in consonance with the number set up in the wheel-series.

Further, before another sequence can be treated, it is necessary to clear the adders 8 by restoring all their wheels $8^b$ to zero position. To these ends a "total" shift-mechanism T is provided, adapted, when the "total" key $T^1$ is pressed, to disengage the cam forks $8^C$ from the adder shaft $8^I$ and leave them upright, with the adder wheels $8^b$ meshed with the carrier teeth $7^c$ and (for numerically large totals) to release all the supplemental carriers $7^{aa}$.

The shift mechanism T comprises the "total" key $T^1$, whose key bar, $T^2$ is suitably pivoted, for convenience, on the action shaft $3^A$; and, mounted in the action frame $1^c$, parallel with said shaft $3^A$ near its reading and opposite faces respectively, a shift rocker $T^3$ and a release rocker $T^{10}$; and pivoted on the grille 13, supplemental carrier stops $T^{20}$.

The shift rocker $T^3$, when operated by the "total" key, simultaneously shifts and engages or disengages all the cam links $8^E$ from or with the adder shafts $8^I$ and operates the release rocker $T^{10}$. It comprises a rock shaft $T^4$; fixed thereto horizontal shift arms $T^5$ severally extending beneath cam links $8^E$ and pivotally connected therewith by posts $8^H$; and a bell-crank $T^6$ adjacent to, and by its horizontal arm, in pin-and-slot connection with the "total" key bar $T^2$.

The release rocker $T^{10}$ comprises a rock shaft $T^{11}$; and fixed thereto a depending arm $T^{12}$ terminating in a pin $T^{13}$ and connected with the vertical arm of the bell crank $T^6$ by a link $T^7$ having an offset head containing a slot $T^8$ in which plays the pin $T^{13}$; a motive arm $T^{14}$; and like release arms $T^{15}$ adjacent to each set of actions, all terminating in pins $T^{16}$.

Each supplemental carrier stop $T^{20}$ normally extends across the paths of the (four) supplemental carriers $7^{aa}$, has its contact face substantially radial from their common axis and a beveled approach edge $T^{21}$ to facilitate their engagement; and is pivoted on the grille by an arm $T^{22}$ parallel with the carriers and containing a terminal cam slot, $T^{23}$, in which plays the pin $T^{16}$ of a release arm $T^{15}$. A like positioning arm $T^{24}$ (without a stop) is similarly pivoted, in line with the release arms; and its cam slot engages the pin $T^{16}$ on the motive arm $T^{14}$. It is normally held against a stop $T^{25}$ by a spring $T^{26}$, to engagingly position the stops $T^{20}$, by positioning the pins $T^{16}$ engaging its slot and thereby positioning the release rocker $T^{10}$ and its pins $T^{16}$; which respectively engage the slots $T^{23}$ of and thereby position the release arms $T^{22}$ and stops $T^{20}$.

When the total key is depressed, it swings the bell-crank $T^6$ and the shift rocker $T^3$, and, by means of the link $T^7$, the release rocker $T^{10}$, whose pins $T^{16}$ retract the positioning arm $T^{24}$ release arms $T^{22}$ and stops $T^{20}$ and release the supplemental carriers $7^{aa}$. The slots in the link $T^7$ and swiveled post $8^H$ provide lost motion such that the adders 8 can be shifted without releasing the supplemental carriers $7^{aa}$, when numerically small totals or sub-totals are to be printed.

Before a total can be printed, it is necessary to separate the pin box 5 and its pins $5^h$ from the actions 7, because control-pins would otherwise extrude control-extension rods 71 and locate their ends in the paths of the carrier fingers $7^k$, to arrest carriers and prevent or spoil the printing of the total; and further, to disengage the adding wheels $8^b$ from the carrier teeth $7^c$, to restore the latter to zero position and reëngage them all alike; for at the end of any cycle, some segments $7^e$ may have carried units and be retracted one tooth farther than the noncarrying ones; and if the carriers were advanced when so related, the carrying ones would rotate their wheels $8^b$ one tooth too much, the total would be falsely printed and its setting spoiled. I therefore add at the end of a card sequence, or interpolate in it where sub-totals are to be taken, three full-size cards, the first punched at all naughts corresponding with series of pins $5^h$; the second a stop card Cs, punched for such naughts and the switch pin $6^u$, and the last a blank.

During the cycle in which the machine is controlled by the first card, the adding wheels $8^b$ and the carryingly positioned bar stops $8^d$ are retracted: said card, when properly positioned against the register stop $5^k$, arrests all the control-pins $5^h$ and $6^u$ and prevents the extension of all control-extension rods 71 except those corresponding with naughts, whose extension it permits.

The carriers are all fully distended and are arrested and positioned at the naught printing line, the action carriers $7^a$ by the extended "0" rods 71 and the supplemental ones by the "total" stop $T^{20}$; the retractors advance, leaving them so positioned; but no hammer $7^D$ strikes because no carrier advances and consequently their cams $7^s$ do not move trip-levers $7^Q$, and nothing is printed; the pin box 5, pins $5^h$, extension rods 71 and register stop $5^k$ are retracted, and card is removed; the wheels $8^b$ are reengaged with the carrier teeth $7^c$, all in like angular relations, and at the end of the cycle, the retractor limit rod $7^s$ contacts with and retracts all the type sectors $7^A$ one tooth angle, but does not move any segment $7^e$, because they all have their carrying stops $7^m$ in contact with nose-faces $8^e$ of bar stops.

The stop-card cycle ensues, and said card when in place arrests all pins $5^h$ and extension rods 71 except those corresponding with naughts, and the switch pin $6^u$, which it permits to advance. The latter immediately causes the operation of the switch mechanism 6, breaks the circuit, stops the machine, and thereby apprises the operator that a total should be printed.

The circuit is then closed and the machine completes the stop-card cycle. The total key T is pressed, which disengages the cam-link $8^E$ from the adder shaft $8^I$ so that the cycle can be made without disengaging the adder wheels $8^b$ from the carrier teeth $7^c$. If a large total is to be printed the operator fully depresses said key to release the supplemental carriers $7^{aa}$, and permits the machine to make a half-cycle on the blank card.

Said card arrests all the pins $5^h$ and $6^u$ and maintains the circuit; the carriers $7^a$ and $7^{aa}$ advance and respectively rotate their meshing adder wheels $8^b$ until their spurs $8^c$ contact with those $8^g$ of the bar-stops, are thereby positioned and severally position meshing carriers with their proper type bars $7^b$ on the print line; and as carriers advance their cams $7^s$ operate hammer actions $7^d$ which release the proper hammers $7^D$ to strike type bars $7^b$ and print the total, after which the wheels $8^b$ are all in zero position. If it is desired to preserve the total as set by them, the machine is allowed to complete its cycle before the total key is released, which leaves the machine ready for reprinting the same total or for further tabulation. But if the machine is to be cleared for another card-sequence and a different total, it is shifted to the hand drive and turned backward far enough to disengage the adder wheels $8^b$ from and permit all the carriers to advance to their limit, where they would all print "9's". When the cycle is resumed and adder wheels will again engage their respective carrier gears $7^c$ all in like angular relations; and as it is completed the blank card will be ejected and the carriers will turn the wheels $8^b$ once and leave them all set at zero and the machine ready for a new card sequence and to add and set a new total.

The platen, paper and inking-mechanism are of known modes.

The platen P is of ordinary construction, mounted in the action frame $1^c$ by its shaft $P^1$ and operably connected with and intermittently turned from a retractor and a hammer shaft 708 by a mechanism comprising a link $P^2$ connecting the arm 710 thereof with a rocking lever $P^3$ whose slotted end engages a pin $P^4$ on an arm $P^5$ swiveled on the platen shaft $P^1$, and medially connected by a link $P^6$ with a rocker arm $P^7$ pivoted on the action frame and medially pivoted thereon a pawl $P^8$ whose hook engages a ratchet wheel $P^9$ fixed to the platen shaft and which can be disengaged therefrom at pleasure by a bell crank $P^{10}$ pivoted on the action frame.

The paper-supply roll 9 is suitably mounted and rotated. The paper $9^a$ is suitably guided by a spring plate $9^b$ and its entry is facilitated by a guide plate $9^c$; and a tension roller $9^d$, holds it against the plate P whose intermittent rotation properly advances it.

The ribbon R, ribbon spools and guide rollers (not illustrated) and ribbon cups $R^1$ are of known types. The alternating ribbon feed comprises a pair of vertical shafts $R^2$ whose upper ends extend into the cups $R^1$, and are suitably formed for the attachment of the spools and to whose lower ends worm wheels $R^3$ are fixed; and a pair of worms $R^4$ on, and by the swinging of a shaft $R^5$, respectively alternately engaged with and disengaged from the worm wheels $R^3$, said shaft being mounted in bearings in a centrally pivoted rocking frame $R^7$, shifted by means of a suitable bar $R^8$ pinned to it and retained in one or other of its two positions by a spring catch $R^9$ which engages one or other notch $R^{10}$ therein.

An operative connection between the action shaft $3^A$ and said shaft $R^5$ intermittently rotates the latter and the spool shaft $R^2$ engaged therewith and comprises an arm $3^T$ on the shaft $3^A$, a spool $R^{11}$ thereon and a ratchet wheel $R^{12}$ on the shaft $R^5$.

As is usual in "visible printing," the bight of ribbon adjacent to the paper is shifted, between impressions, by a connection with the outer retractor cheeks $7^r$ comprising curved rocking arms $R^{20}$ pivoted on the action frame and terminating in loops $R^{21}$ through which the ribbon runs; links $R^{22}$ whose ends are respectively pinned to arms $R^{20}$ and ride (by pins) in slots $R^{23}$ formed in pivoted anti-friction bearing bars $R^{24}$ and which are each provided with a medial slotted turn buckle $R^{25}$; and bell cranks $R^{30}$ each retracted by a spring $R^{31}$ strained between it and the action frame and having terminal pins $R^{32}$ and $R^{33}$ which respectively ride the adjacent retractor cheek plate $7^r$ and engage the slot in the turn buckle $R^{25}$ and thereby swing the ribbon.

My tabulating actions and the adders may be parts of new machines or applied to many which I have heretofore made and sold. In the latter case the foregoing tabulating-action is accurate because it includes only new parts. But for wholly new machines accurate analysis must include the control pins $5^h$ in the tabulating actions and treat each such action as comprised of like series of analyzing control pins and control-extension rods, a carrier and a hammer action.

Making the carrier $7^a$ with two sectors, and its peculiar form, are survivals and moreover give it functions useful in special cases but not germane to this use. Study will show that because they are closed when the printing members are idle and necessarily detached from and reëngaged with adder wheels $8^b$ in order to "set" the units carried and to print true totals, they can be made integral if their mode of connection with the retractor $7^p$ be slightly modified.

Having thus described my invention, I claim:

1. A tabulation-printing machine adapted to be controlled by characteristic conformations of record bodies to tabulate in print the records thereof and comprising control members adapted to analyze and to be positioned in consonance with such conformations and when so positioned to reproduce such records in a different location to control tabulation-printing actions; tabulation-printing actions adapted to be positioned by contact with record-reproducing control members to tabulate and to so print the controlling record-body-conformation record; and adding-and-carrying actions adapted to coact with said tabulation-printing actions to add and set totals of the records tabulated and to position type-carrying members for printing such totals; a sequence of record bodies whose several characteristic conformations record statements which are to be tabulated; and located in said sequence, where a total is to be taken, in the order stated, a series of bodies adapted to enable a total to be taken and tabulation to be resumed immediately thereafter and including a body whose conformations are adapted to position at zero location all the tabulating members and to prevent printing; a stop body of special conformation adapted to retain the aforesaid members in zero location and to suspend work and prevent printing; and a blank body, during whose transit through the machine the total is printed and at whose exit the machine is ready to tabulate.

2. A tabulation-printing machine adapted to be controlled by characteristic perforations of record cards to tabulate in print the records thereof and comprising a frame and mounted thereon a power shaft provided with operating and power-supply members, a card support perforated in series registering with record-point series of such record cards, card-supplying means adapted to supply cards to, functioningly position them on and remove them from said support, and record-analyzing control members mounted between said shaft and support in register with and reciprocated by said shaft through the perforations of the support when not obstructed by an unperforated point of a card, said control members adapted to analyze and to be positioned in consonance with card-perforation records and when so positioned to be extended and to reproduce such record in a convenient location to control tabulation-printing actions; tabulation-printing actions adapted to be positioned by contact with record-reproducing control members to tabulate and to so print the controlling card-records; a work-suspending control member mounted and reciprocated with the record-analyzing control members and adapted to be extended through the card support when not obstructed by an unperforated point in a card; and operably connected therewith a work-suspending apparatus normally inactive but adapted to be made operative to suspend work whenever said work-suspending control member is fully advanced.

3. A tabulation-printing machine adapted to be controlled by characteristic perforations of record cards to tabulate in print the records thereof and comprising a frame and mounted thereon a power shaft provided with operating and power-supply members; a card support perforated in series registering with record-point series of such record cards, card-supply means adapted to supply cards to, functioningly position them on and remove them from said support, and closely-spaced series of record-analyzing control members mounted between said shaft and support, in register with and reciprocated by said shaft through the perforations of the support when not obstructed by an unperforated point of a card, said control members adapted to analyze and to be positioned in consonance with card-perforation records; series of control-extension rods supplementing the length of, extending to a convenient location, and there reproducing the card-perforation records analyzed by functioning control members to control tabulation-printing actions; sets of printing actions each set coacting with an equal number of series of control members to independently tabulate in print statements recorded in different zones of record cards, and each comprising a type carrier operably mounting a sequence of type, adapted to be positioned and to printingly position type of its type-sequence by contact with a record-reproducing member, and provided with a gearing; supplemental non-tabulating type carriers like and in series with the tabulation-action type carriers, similarly related with adding-and-carrying actions, and adapted to supplement action carriers in adding and setting and subsequently printing, large totals; corresponding sets of adding and carrying actions severally operably related with and adapted to be operated by said carriers to add and set totals and to position said carriers and type of their type sequences for printing such totals; some of the sets of actions offset from the series of control members with which they co-act, and their control-extension rods correspondingly offset.

4. A tabulation-printing machine adapted to be controlled by characteristic perforations of record cards to tabulate in print the records thereof and comprising a frame and mounted thereon a power shaft provided with operating and power-supply members, a card support perforated in series registering with record-point series of such record cards, card-supply means adapted to supply cards to, functioningly position them on and remove them from said support, and series of record-analyzing control members mounted between said shaft and support in register with and reciprocated by said shaft through the perforations of the support when not obstructed by unperforated point of a card, said control members adapted to analyze and to be positioned in consonance with card-perforation records; like series of control-extension rods supplementing the length of, extending to a convenient location and there reproducing the records analyzed by functioning control members to control tabulation-printing actions; tabulation-printing actions adapted to be positioned by contact with record-reproducing control members to tabulate and to so print the controlling card-records; an action shaft operably connected with the main shaft and actions and adapted to operate the latter; and an elastically cushioned operating member in the operable connection between the main and action shafts.

5. A tabulation-printing machine adapted to be controlled by characteristic perforations of record cards to tabulate in print the records thereof and comprising a frame and mounted thereon a main shaft provided with operating members; a gear case; operably mounted thereby a motor and a transmission whose final gear is operably related to the main shaft; a hand-drive gear fixed to and a shift gear on the main shaft, a hand-drive gear; a slide operably mounting it, operably connected with and adapted when slid to engage the shaft and final transmission gears and disengage the hand-drive gears for the power drive and vice-versa for the hand-drive; a card support perforated in register with record-points of such record cards, card-supply means adapted to supply cards to, functioningly position them on and remove them from said support; and record-analyzing control members mounted between said shaft and support in register with and reciprocated by said shaft through the perforations of the support when not obstructed by an unperforated point of a card, said control members adapted to analyze and to be positioned in consonance with card-perforation records and when so positioned to be extended and to reproduce such record in a convenient location to control tabulation-printing actions; and tabulation-printing actions adapted to be positioned by contact with record-reproducing control members to tabulate and to so print the controlling card-records.

6. A tabulation-printing machine adapted to be controlled by characteristic perforations of record cards to tabulate in print the records thereof and comprising a frame and mounted thereon a power shaft provided with operating and power-supply members, a card support perforated in register with record points of such record cards, card-supply means adapted to supply cards to, functioningly position them on and remove them from said support, and record-analyzing control members mounted between said shaft and support in register with and reciprocated by said shaft through the perforations of the support when not obstructed by an unperforated point of a card, said control members adapted to analyze and to be positioned in consonance with card-perforation records and when so positioned to be extended and to reproduce such record in a convenient location to control tabulation-printing actions; a work-suspending control member mounted and reciprocated with the record-analyzing control members and adapted to be extended through the card support when not obstructed by an unperforated point in a card and a hand-operable work-suspending mechanism operably connected with the power-supply, a member connected with and moved by the main shaft and a member connected with and normally held inoperative by the work-suspending control member but by the full advance thereof rendered operative and caused to operate said hand-operable work-suspending mechanism to suspend work; and tabulation-printing actions adapted to be positioned by contact with record-reproducing control members to tabulate and to so print the controlling card-records.

7. A tabulation-printing machine comprising control members adapted to analyze and to be positioned in consonance with characteristic perforations of record cards and to reproduce the records thereof; tabulation printing actions each comprising a type-carrier provided with a gearing for connection with an adding-and-carrying action, operably mounting a sequence of type, and adapted to be actuated into contact with a record-reproducing control member to be thereby positioned, to printingly position type of such sequence; supplemental, non-addition-carrying type carriers like and in series with the aforesaid carriers; adding-and-carrying actions operably related with the aforesaid carriers, during tabulation, to add and set totals, and subsequently to cause such totals to be printed; and a total-taking mechanism adapted, during tabulation, to non-printingly limit the advance of all the supplemental, non-tabulating carriers, and when operated to cease to so limit them, and cause the machine to suspend tabulation and print a total or totals.

8. In a tabulation-printing machine comprising control members adapted to analyze and to be positioned in consonance with characteristic perforations of record cards; tabulation-printing actions adapted to be positioned and to printingly position type by contact with a record-reproducing control member, and to co-act with adding-and-carrying actions; and adding and carrying actions operably related therewith, during tabulation, to add and set totals and subsequently to cause such totals to be printed, the combination therewith of a sequence of record-cards whose records are to be tabulated, and located in said sequence, where a total is to be taken, in the order stated, a series of cards adapted to enable a total to be taken and tabulation to be resumed immediately thereafter, and including a card perforated to position at zero all the tabulating members of the tabulating-printing actions and prevent printing; a stop-card perforated to retain the aforesaid members in zero location to suspend work and to prevent printing; and a blank card which during its transit through the machine renders the control members inactive, and permits a total to be taken, and at whose exit the machine is ready to tabulate.

9. In a tabulation-printing machine mechanically controlled by characteristic conformation of record bodies to tabulate in print the records thereof, a frame, a support for record bodies, reciprocating control members adapted to mechanically analyze and to be positioned in consequence with such conformations to reproduce the records thereof; a register stop reciprocating with and adapted to stop and position record bodies in operable relation to said control members; and tabulation-printing actions each operably mounting a sequence of type, and adapted to be positioned and to printingly position type of such sequence by contact with a record-reproducing control member, and calculator elements operated by the oscillation of the said type carriers.

10. In a machine controlled by characteristic conformations of record bodies, a frame; and mounted thereon a support for record bodies, a main shaft mounting power-supply and operating members and a motor operably connecting said shaft with a source of power; reciprocating control members adapted to analyze and to be positioned in consonance with said characteristic conformations to control the operation of the machine; a hand-operable work-suspending mechanism operably related with and adapted to suspend the supply of power, but normally inactive; a work-suspending motive member moved by said main shaft; a work-suspending control member adapted to be reciprocated with said record-analyzing control members but whose advance is normally limited by a record body on said support, and connected therewith a member normally inoperatively positioned but advanceable thereby to operable relation with said motive member, to be thereby operated to operate said work-suspending mechanism.

11. A tabulation-printing machine adapted to be controlled by characteristic perforations of record cards to tabulate in print the records thereof and comprising a frame and mounted thereon a power shaft provided with operating and power-supply members, a card support perforated in series registering with record-point series of such record cards, card-supply means adapted to supply cards to, functioningly position them on and remove them from said support, and record-analyzing control members mounted between said shaft and support in register with and reciprocated by said shaft through the perforations of the support when not obstructed by an unperforated point of a card, said control members adapted to analyze and to be positioned in consonance with card-perforation records and when so positioned to be extended and to reproduce such record in a convenient location to control tabulation-printing actions; tabulation-printing actions adapted to be positioned by contact with record-reproducing control members to tabulate and to so print the controlling card-records; a work-suspending control member mounted and reciprocated with the record-analyzing control members and adapted to be extended through the card support when not obstructed by an unperforated point in a card; and operably connected therewith a work-suspending apparatus normally inactive but adapted to be made operative to suspend work whenever a record body of work-suspending conformation is located in the machine.

JAMES POWERS.

Witnesses:
JOHN MORRIS,
JOSEPH F. V. CHRISTOPHER.